United States Patent [19]

Nilsson

[11] Patent Number: 4,961,606

[45] Date of Patent: Oct. 9, 1990

[54] DEVICE FOR ADAPTION OF A SUCTION PAD TO THE OUTER SHAPE OF PRODUCTS TO BE LIFTED

[76] Inventor: Hans E. G. Nilsson, Skravelsjö 21096, Umeå, Sweden, S-905 90

[21] Appl. No.: 249,779

[22] Filed: Sep. 22, 1988

[30] Foreign Application Priority Data

Oct. 6, 1987 [SE] Sweden ................................ 8703844

[51] Int. Cl.⁵ ........................... B25J 15/06; B66F 9/18

[52] U.S. Cl. ........................................ 294/65; 414/627

[58] Field of Search ........................ 294/65, 64.1, 65.5; 414/627, 620

[56] References Cited

U.S. PATENT DOCUMENTS

| | | | |
|---|---|---|---|
| 3,147,872 | 9/1964 | Olson | 294/65 X |
| 3,260,391 | 7/1966 | Horton | 294/65 X |
| 3,332,715 | 7/1967 | Hickman et al. | 294/64.1 X |
| 3,342,359 | 9/1967 | Sawdey | 294/64.1 X |
| 3,367,705 | 2/1968 | Ames | 294/64.1 X |
| 3,923,177 | 12/1975 | Horton | 294/64.1 X |
| 3,955,843 | 5/1976 | Ottenues et al. | 294/64.1 |
| 3,982,782 | 9/1976 | Bos | 294/64.1 X |
| 4,640,661 | 2/1987 | Rasmussen | 294/64.1 X |

FOREIGN PATENT DOCUMENTS 8401191 4/1987 Sweden .

*Primary Examiner*—Johnny D. Cherry
*Attorney, Agent, or Firm*—Bacon & Thomas

[57] ABSTRACT

The present invention relates to a device for permitting adaptation of a suction pad (6) to the outer shape of products (1) to be lifted, whereby at least two brackets (13, 19) via links are pivotally connected to a carrying member (8), whereby at each bracket via links are pivotally arranged at least two supports (17, 18 and 23, 24) on which the suction pad is provided and whereby the supports are movable relative to each other. For the supports (17 and/or 23) to provide such a large degree of rotation that the suction pad (6) can adapt to products in the form of paper rolls (1) with substantially different diameters, one of the brackets (13, 19) is rotatably mounted on the carrying member (8) through a double link (**11*a*, 11*b*) in order to permit a large degree of rotation between the bracket (13) and the carrying member (8) whereby one (17 and/or 23) of the supports (17, 18, 23, 24) is provided on each bracket (13 and/or 19) through a double link (15*a*, 15*b* and/or 21*a*, 21*b***).

11 Claims, 3 Drawing Sheets

DEVICE FOR ADAPTION OF A SUCTION PAD TO THE OUTER SHAPE OF PRODUCTS TO BE LIFTED

BACKGROUND OF THE INVENTION

1. Field of the Invention

The present invention relates to a device for permitting adaptation of a suction pad to the outer shape of products to be lifted, whereby at least two brackets are pivotally connected via links to a carrying member, whereby at each bracket via links are pivotally arranged at least two support means on which the suction pad is provided and whereby the support means are movable relative to each other and the links allow the support means to alter their mutual positions such that the suction pad is adaptable to the products, preferably in the form of paper rolls with substantially different diameters.

2. Description of the Related Art

Devices for adaptation of suction pads to paper rolls to be lifted are already known from U.S. Pat. Nos. 3,147,872 and 3,982,782. For obtaining the desired flexibility regarding the ability of adaptation, these prior art devices have a plurality of separate suction pads. The necessity for using a plurality of separate suction pads, however, requires, that rather extensive link arm systems for, e.g., holding the suction pads. Additionally, rather extensive hose or pipe systems are required for connecting each suction pad to a vacuum-generating device. A problem with said link systems and hose or pipe systems is that they are heavy and sensitive in operation and comprise a rather large number of movable members.

A device in which each suction pad has a rather good adaptation ability is already known from the U.S. Pat. No. 3,955,843. In this case however, the adaptation ability is arrived at by means of a very complex link arm system with the same drawbacks as said prior art devices.

SUMMARY OF THE INVENTION

The object of the present invention is to eliminate said problems and provide the required adaptation ability for a suction pad of an utterly simple link arm system. The system preferably includes a carrying means designed to support two bracket means, which brackets individually pivotally mount support means which may each comprise two support portions. A key feature of the system is the combination of double links and single links that pivotally connect the bracket means to the carrying means and the support means to the bracket means so that products of different sizes may be grasped while limiting side-to-side movement of the grasped product.

By having said characterizing features, the device according to the invention achieves the required adaptation ability by means of a substantially simpler and more robust link arm system, which has a good reliability in operation, low weight and comprises a relatively small number of movable members.

BRIEF DESCRIPTION OF THE DRAWINGS

The invention will be further described below with reference to the accompanying drawings, in which.

DETAILED DESCRIPTION OF THE PREFERRED EMBODIMENT

Figure 1:
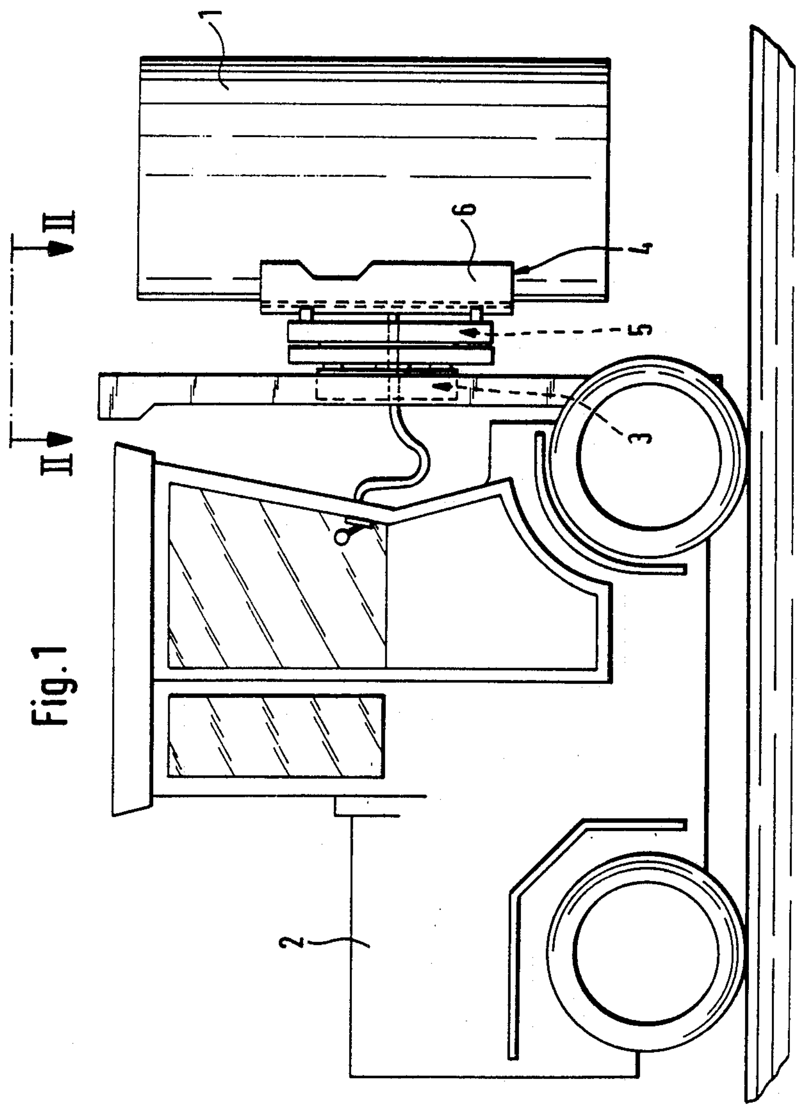
FIG. 1 is a side view of a truck with a device according to the invention.

The device shown is adapted to grip, lift and transport paper rolls with a diameter of, e.g., 0.5 m, but also paper rolls with a diameter of about 2 m or more. The transport of the paper rolls occurs by means of a truck 2. The truck has, as is known per se, a hoisting unit 3 with a transfer device 4 for gripping the paper rolls 1. This transfer device 4 includes a device 5 for adapting a so-called suction pad 6 to the outer shape of the paper roll 1. This device 5 is provided on a unit 7 which in turn is releasably mounted on the hoisting unit 2 of the truck.

A carrying member 8 forming part of the device 5 is provided on the unit 7 and includes a vertically directed single link 9 on one side of a symmetry line 10 through the device 5 and a double link 11*a*, 11*b* at substantially the same distance from and on the other side of the symmetry line 10. The double link 11*a*, 11*b* comprises a vertically directed link 11*a* provided on the carrying member 8 and from which a short arm 12 protrudes in such a manner that it is pivotable relative to the carrying member 8. The short arm 12 has in turn a vertically directed link 11*b*, through which a central part of a bracket 13 is pivotally mounted on the arm 12. The end portion of the bracket 13 closest to the symmetry line 10 has a vertically directed single link 14 and its other end portion a double link 15*a*, 15*b*, whereby the single link 14 and the double link 15*a*, 15*b* are situated at about the same distance from the central part of the bracket 13. The double link 15*a*, 15*b* comprises a vertically directed link 15*a* provided on the bracket 13 and through which a short arm 16 is pivotable relative to the bracket 13. The short arm 16 has in turn a vertically directed link 15*b* on which an arcuate support portion 17 is pivotally mounted relative to the arm 16. An arcuate support portion 18 is pivotally mounted on the bracket 13 through the single link 14. Support portions 17, 18 therefore comprise a single support means supported by bracket 13.

A central part of a bracket 19 is through the single link 9 pivotally mounted on the carrying member 8. The end portion of the bracket 19 closest to the symmetry line 10 has a vertically directed single link 20 and the other end portion a double link 21*a*, 21*b*, whereby said links 20 and 21*a*, 21*b* are situated at about the same distance from the central part of the bracket 19. The double link consists of a vertically directed link 21*a* which is mounted on the bracket 19 and through which a short arm 22 is pivotally mounted on the bracket 19. The short arm 22 has in turn a vertically directed link 21*b* through which an arcuate support portion 23 is pivotally mounted relative to said arm 22. An arcuate support portion 24 is through the single link 20 pivotally connected to the bracket 19. Support portions 23, 24 therefore comprise a single support means supported by bracket 19.

Figure 2:
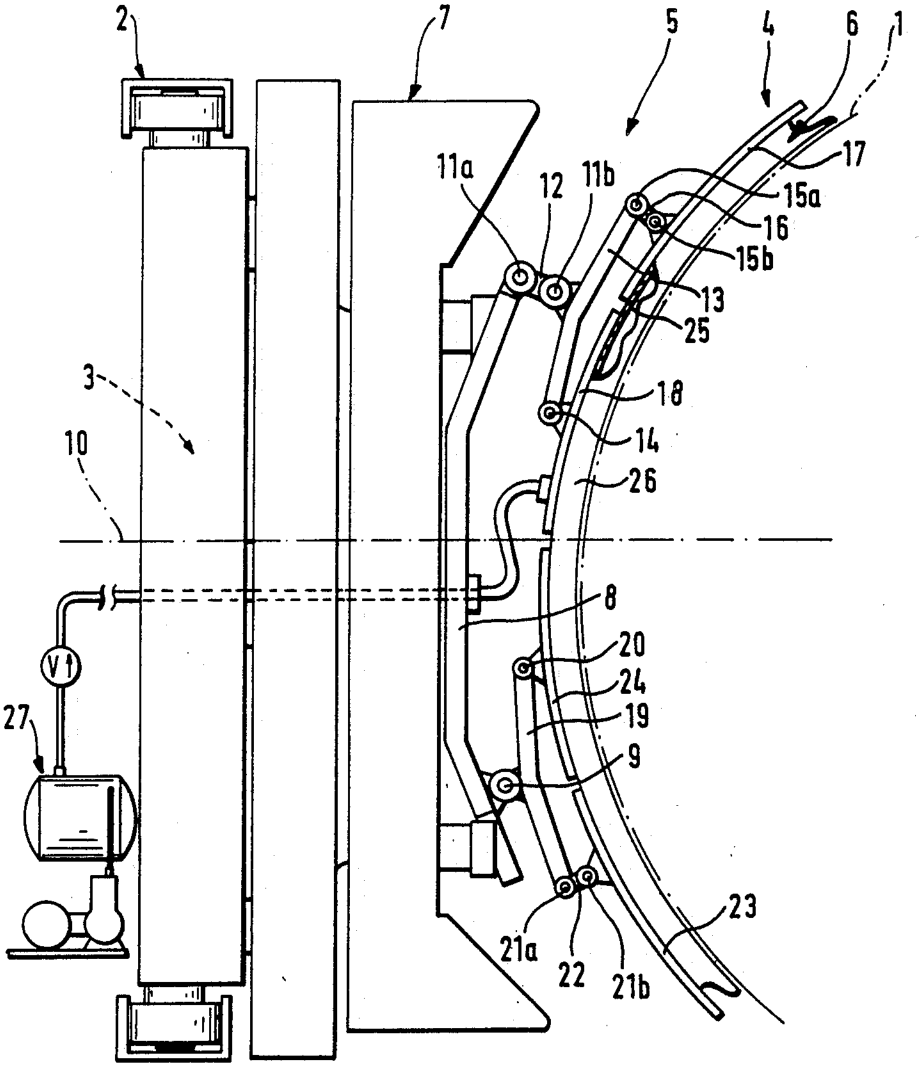
FIG. 2 is a view along line II—II of the device of FIG. 1.

The suction pad 6 is made of an elastic material and includes a bottom portion 25 and a four sided collar 26 extending outwardly therefrom. The bottom portion 25 is mounted on the support portions 17, 18, 23 and 24 and provides a hinge effect therebetween such that they may alter their mutual positions. The collar 26 is arranged such that it sealingly engages the outer sides of the paper roll. In order to fetch a paper roll 1, the truck 2 is moved thereto and the suction pad 6 pressed against its outer side, whereby the links of the adaptation device 5 permit adaptation of the suction pad 6 to the diameter of the paper roll 1 in order to, e.g., lift paper rolls with a diameter of 2 m or more (see FIG. 2). When the suction pad 6 engages the paper roll 1, a vacuum is generated within said pad in a manner known per se by means of a vacuum generating device 27. The paper roll 1 is thereby sucked onto the suction pad 6 with such a power that the paper roll 1 may be lifted by means of the hoisting unit 3 and transported to a desired location with the truck 2.

Figure 3:
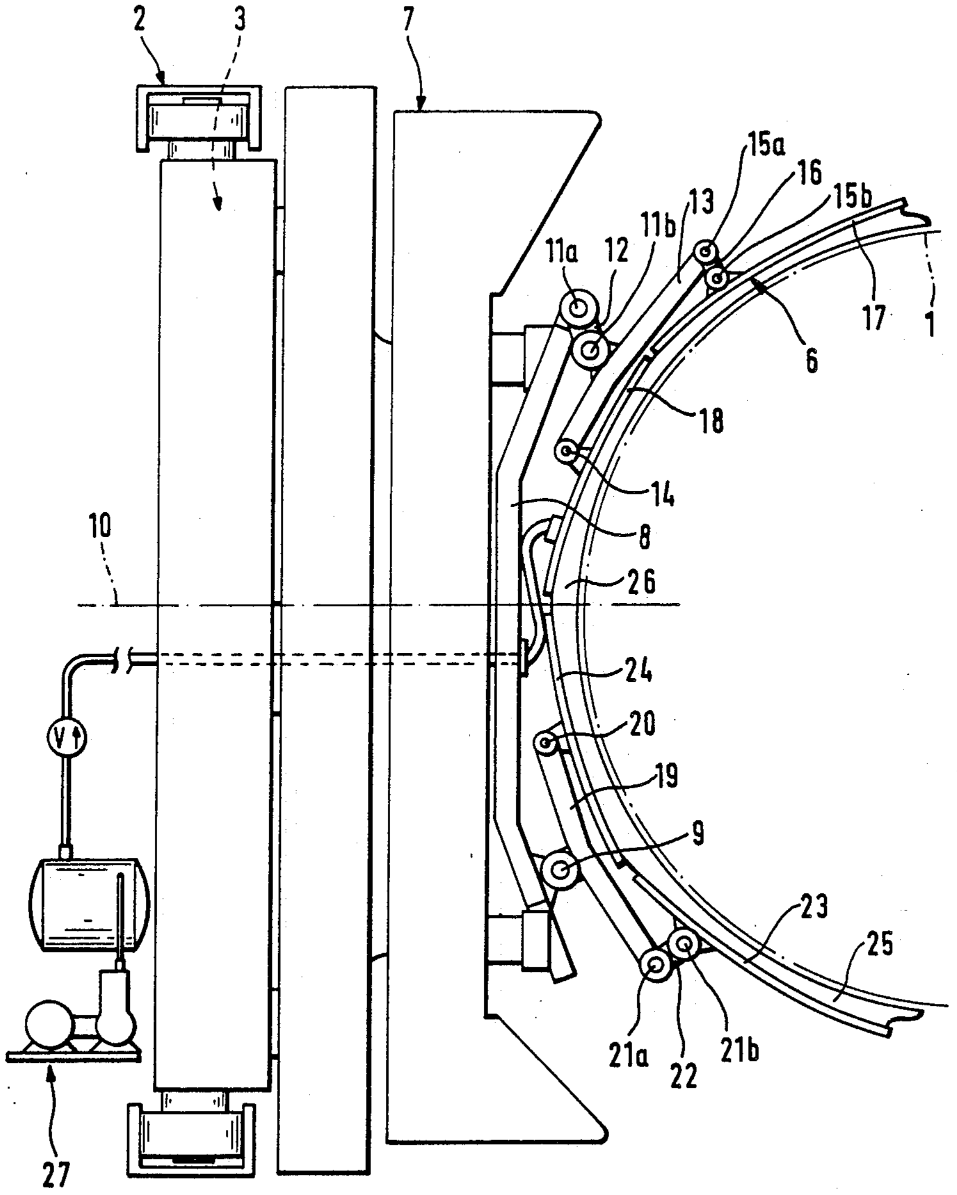
FIG. 3 corresponds with FIG. 2 but illustrates the device according to the invention adapted to a paper roll of lesser diameter.

The adaptation device 5 permits adaptation of the suction pad 6 also to paper rolls with substantially lesser diameter then 2 m, e.g. paper rolls with a diameter of 0.5 m (see FIG. 3). This is made possible while the double links 11*a*, 11*b*; 15*a*, 15*b* and 21*a*, 21*b* allow the support portions 17, 18, 23 and 24 to alter their mutual angular positions to a substantially larger degree than what is possible with only single links, i.e. the support portions 17, 18, 23, 24 may rotate and be substantially "angled together" relative to each other. The single link 9 ensures that the adaptation device 5 cannot move sideways relative to the symmetry line 10 in its entirety and the single links 14, 20 ensure that the support portions 17, 18, 23, 24 cannot move too much relative to each other. The bottom portion 25 of the suction pad 6 preferably allows all support portions 17, 18, 23, 24, after use, to automatically set in positions along the same arc.

The paper rolls 1 are left at a predetermined location simply by being put down by means of the hoisting unit 3, whereafter the grip is loosened by simply opening a valve such that the vacuum in the suction pad 6 ceases. Thereafter, the suction pad 6 returns to its original shape, which means that the support portions 17, 18, 23, 24 are returned to about those mutual positions shown in FIG. 2, whereafter one can continue to fetch paper rolls with large or substantially lesser diameter.

The great adaptation capacity of the device is attained with only two movable brackets 13 and 19, which simplifies the device and makes it stable and reliable in operation without turning it into a heavy unit.

The invention is not limited to the embodiment described above and shown in the drawings. Thus, there may be more than two brackets 13, 19 and more than four support portions 17, 18, 23, 24. Support portions 18, 24 provided on the brackets 13, 19 via single links 14, 20 can preferably be located closest to the symmetry line 10 through the adaptation device 5. In certain cases it might be sufficient to use only one bracket 13 or 19 with a double link for support means and the support means may have another shape than the arcuate shape shown. The adaptation device may be used for gripping other products than paper rolls and transport may occur with other units than trucks. The transfer device 4 can be rotatable relative to the hoisting unit 3 for fetching products lying down or turning products, and thus, the links are directed vertically only when the transfer device 4 is in its vertical position.

I claim:

1. A device for adaptively grasping a product, comprising:

carrying means having first and second ends;

first and second bracket means respectively pivotally connected to said first and second ends of said carrying means, said carrying means arranged to adaptively position said first and second bracket means in a product grasping relationship;

first and second support means for supporting said product, said first and second support means pivotally connected to said first and second bracket means, respectively; and suction pad means provided on said first and second support means for directly contacting said product when said first and second bracket means are in said product grasping relationship, wherein said first bracket means is pivotally connected to the first end of said carrying means via a double link, and said second bracket means is pivotally connected to the second end of said carrying means via a single link.

2. A device for adaptively grasping a product as claimed in claim 1, wherein said first bracket means includes first and second ends, said first support means comprising a first support portion pivotally connected via a double link to said first end of said first bracket means and a second support portion pivotally connected via a single link to said second end of said first bracket means.

3. A device for adaptively grasping a product as claimed in claim 2, wherein said second bracket means includes first and second ends, said second support means comprising a first support portion pivotally connected via a double link to the first end of said second bracket means and a second support portion pivotally connected via a single link to the second end of said second bracket means.

4. A device for adaptively grasping a product as claimed in claim 3, wherein the first and second support portions of said first support means and the first and second support portions of said second support means are arranged along an essentially common arc, and wherein the first support portions of each support means are arranged at opposite ends of said arc from each other.

5. A device for adaptively grasping a product as claimed in claim 3, wherein said suction pad means includes a bottom portion that aligns all four support portions along a common arc.

6. A device for adaptably grasping a product as claimed in claim 1, wherein said suction pad means includes a bottom portion mounted to both of said support means, whereby said bottom portion hingedly connects said first and second support means.

7. A device for adaptively grasping a product, comprising:

carrying means having first and second ends;

first and second bracket means respectively pivotally connected to said first and second ends of said carrying means, said carrying means arranged to adaptively position said first and second bracket means in a product grasping relationship;

first and second support means for supporting said product, said first and second support means pivotally connected to said first and second bracket means, respectively; and suction pad means provided on said first and second support means for directly contacting said product when said first and second bracket means are in said product grasping relationship, wherein said first bracket means includes first and second ends, said first support means comprising a first support portion pivotally connected via a double link to said first end of said first bracket means and a second support portion pivotally connected via a single link to said second end of said first bracket means.

8. A device for adaptively grasping a product as claimed in claim 7, wherein said second bracket means includes first and second ends, said second support means comprising a first support portion pivotally connected via a double link to the first end of said second bracket means and a second support portion pivotally connected via a single link to the second end of said second bracket means.

9. A device for adaptively grasping a product as claimed in claim 8, wherein the first and second support portions of said first support means and the first and second support portions of said second support means are arranged along an essentially common arc, and wherein the double links that connect the first support portions of each support means to said first and second bracket means, respectively, are arranged at opposite ends of said arc from each other.

10. A device of adaptively grasping a product as claimed in claim 8, wherein said suction pad means includes a bottom portion that aligns all four support portions along a common arc.

11. A device for adaptively grasping a product as claimed in claim 7, wherein said suction pad means includes a bottom portion mounted to both of said support means, whereby said bottom portion hingedly connects said first and second support means.

* * * * *